(12) United States Patent
Moss et al.

(10) Patent No.: US 8,259,605 B2
(45) Date of Patent: Sep. 4, 2012

(54) PACKET HEADER STRUCTURE

(75) Inventors: Jeremy Moss, Ashtead (GB); Adrian W. Payne, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 305 days.

(21) Appl. No.: 12/595,105

(22) PCT Filed: Apr. 14, 2008

(86) PCT No.: PCT/IB2008/051414
§ 371 (c)(1),
(2), (4) Date: Oct. 8, 2009

(87) PCT Pub. No.: WO2008/126051
PCT Pub. Date: Oct. 23, 2008

(65) Prior Publication Data
US 2010/0166016 A1    Jul. 1, 2010

(30) Foreign Application Priority Data
Apr. 17, 2007  (EP) .................................. 07300957

(51) Int. Cl.
*H04L 12/28* (2006.01)
(52) U.S. Cl. .................. 370/252; 370/389; 370/394
(58) Field of Classification Search .................. 370/205, 370/212, 213, 215, 252, 255, 389, 392, 393, 370/394, 474, 475, 476, 503–514
See application file for complete search history.

(56) References Cited

U.S. PATENT DOCUMENTS

| 5,241,545 | A |   | 8/1993  | Kazecki et al. |
|-----------|---|---|---------|----------------|
| 5,760,717 | A |   | 6/1998  | Scholz |
| 5,969,649 | A | * | 10/1999 | Ashley et al. ................... 341/59 |
| 7,106,814 | B2 | * | 9/2006 | Carsello ........................ 375/343 |
| 7,406,082 | B2 | * | 7/2008 | Nagarajan et al. ............ 370/394 |
| 7,430,261 | B2 | * | 9/2008 | Forest et al. ................... 375/364 |

FOREIGN PATENT DOCUMENTS

| EP | 0875891 A2 | 11/1998 |
| WO | 2004100423 A2 | 11/2004 |
| WO | 2005114893 A1 | 12/2005 |

* cited by examiner

*Primary Examiner* — Yemane Mesfin
*Assistant Examiner* — Mon Cheri Davenport
(74) *Attorney, Agent, or Firm* — Larry Liberchuk

(57) ABSTRACT

The present invention relates to a data packet header comprising a first bit field consisting of a first sequence of bits with identical values and a second bit field consisting of a second sequence of bits, the second sequence of bits being subject to a run-length restriction, and located immediately after the first sequence of bits in the order of transmission. The number of bits in the first sequence is equal to or exceeding the run-length restriction and the bits of the second sequence have opposite identical values to the value of the first bit of the second sequence of bits. The invention equally relates to a correlator for detecting a data stream and arranged to determine a correct clock phase for the data stream.

5 Claims, 7 Drawing Sheets

PACKET HEADER STRUCTURE

TECHNICAL FIELD

The present invention relates to a new header structure for a data packet. The invention equally relates to a method of generating such a header using a transceiver and to a method of detecting such a header by a correlator. The invention also relates to corresponding transceiver and correlator and to computer programs suitable for implementing the methods.

BACKGROUND OF THE INVENTION

Clock extraction, also known as clock synchronization, is the name given to the process of regenerating a local clock signal from an incoming data stream, which is then used for sampling that data stream into a data buffer. Successful regeneration of the clock signal in a receiver ensures that a transmitted sequence of bits is correctly clocked into the receive buffer. FIG. 1 illustrates this by showing a waveform that is sampled by a bit clock that has a phase error with respect to the incoming data stream. Bit errors are more likely to occur around the edges of bits due to channel filtering, which means that the ideal sampling point is in the middle of each bit. In FIG. 1, the first stream from the top of the figure corresponds to the original data stream, the second stream corresponds to correctly sampled data stream and the last stream corresponds to incorrectly sampled data stream. In this example, the phase error has resulted in the sequence of bits 0110100010 being decoded as 0010000010.

There are various ways of extracting the clock signal from a received signal, all of which require that the incoming data stream has a reasonable number of transitions or edges. The edges are used as a reference point against which the local clock can adjust itself to obtain correct synchronization.

The requirement for these edges places a restriction on how the data is coded at the transmitter end. Raw data packets could contain any combination of bits, some of which may contain few if any edges. For this reason, for instance medium access control (MAC) protocols often add a preamble to the start of a packet that contains a known string of bits that contain a suitable number of edges. FIG. 2 shows a typical packet header structure comprising such a header. Preambles are used by the clock extraction circuit to obtain correlation before the raw data arrives, therefore ensuring that data can be decoded correctly once the data arrives. The preamble advantageously contains a sequence of bits in which zero and one bits (hereinafter referred to as 0's and 1's) alternate to provide a maximum number of edges. An example of a typical preamble is: 10101010. The longer the preamble, the better the synchronization is that can be achieved by a suitable clock extraction circuit.

For long packets, it is sometimes beneficial to continue clock extraction from the incoming data stream. This can be achieved for instance by using a digital phase locked loop (DPLL), for the duration of the whole packet. This ensures that any drift in the transmitter's clock, which becomes more noticeable in longer packets, is compensated for at the receiver. The disadvantage of this method is that DPLL must be running at its oversampling rate for the duration of the packet, therefore consuming more energy.

Once the bit clock has been correctly obtained, it is necessary to synchronize the receiver at word level. This is usually achieved using a synchronization word transmitted just after the preamble as shown in FIG. 2. The receiver, having achieved bit synchronization, monitors reception of the known synchronization word. At this point, it is then able to successfully process any data that follows. The synchronization word should be designed in such a way as to be robust to bit errors causing errors which lead to non-recoverable packet errors.

However, any extra information that is added to the transmitted data represents an undesirable overhead in transmission due to the extra energy and time required to transmit it. Minimizing these overheads is a key part of protocol design.

It is usual in communication systems for messages to be destined for a particular recipient. To enable suitable delivery mechanisms, devices are often given an address, which can be used by other devices to communicate with it. It is common practice to design transmission protocols which place the destination address shortly after the synchronization word in the data packet to enable receiving nodes to power down as quickly as possible if the message isn't destined for them. A possible optimization of this is therefore to use the device address as the synchronization word. In this way, a match with the synchronization word not only indicates time alignment to the receiving device but further indicates that the packet is destined for it.

The invention aims at providing a new packet header structure with minimal overhead and thus leading to power reductions. The invention also provides an effective way of detecting the packet header structure.

SUMMARY OF THE INVENTION

According to a first aspect of the invention there is thus provided a header for a data packet.

The first bit field can thus be used as a wake-up trigger for a receiver circuitry to allow power saving. Indeed, the bit sequence of the first bit field consisting of successive '1's or '0's allows a simple mechanism, such as a low-pass filter, to be used for activating a correlator used at the reception of the packet. There is thus a unique and easy way to detect wake-up sequence that enables most of the receiver's processing to be powered-down until it is detected.

Furthermore, the fact that the bits of the first bit field are different from the first bit of the second bit field ensures that an edge is guaranteed. Because the maximum run-length restriction does not apply to the first field, asymmetry in the binary word consisting of the data packet header is ensured and therefore framing errors can be prevented. An example of this could be a bit sequence with an addressing field of 1101101101 that was preceded with noise corresponding to a binary value 110. In this instance, the receiver would match three bits earlier than it should, resulting in a framing error and a lost packet. But as the number of bits in the sequence of bits of the first bit field exceeds the maximum run-length of the sequence of bits of the second bit field, framing errors do not occur.

The run-length restriction also has the advantage that a certain number of edges are provided within the packet header. The run-length restriction also provides a rule against which received packets that contain addresses for other devices can be distinguished from noise, enabling the receiving device to correctly switch off to save power.

The header structure makes a duty-cycled protocol, which is very efficient in terms of how much time receivers must operate before useful data could be received and validly decoded.

According to another aspect of the present invention there is provided a method of generating the packet header as recited in claim 1.

According to another aspect of the invention there is further provided a computer program product comprising instructions for implementing the method according to the second aspect, when loaded and run on computer means of a transceiver of a communication system.

According to another aspect of the invention, there is provided a transceiver.

According to another aspect of the invention there is provided a method of detecting a data packet header.

According to another of the invention there is further provided a computer program product comprising instructions for implementing the method according to the fourth aspect, when loaded and run on computer means of a correlator.

According to another aspect of the invention, there is further provided a correlator. The correlator is designed to use all of the over-sampled values to intelligently pick the optimum sample in the middle of the bit so that it works reliably over a small number of bits.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

Some embodiments of the invention will now be described in more detail with reference to the appended drawings. Next two exemplary header structures are explained with reference to FIGS. 3A and 3B and then the header structure shown in FIG. 3A is compared to a conventional header structure as shown in FIG. 4.

Figure 1:
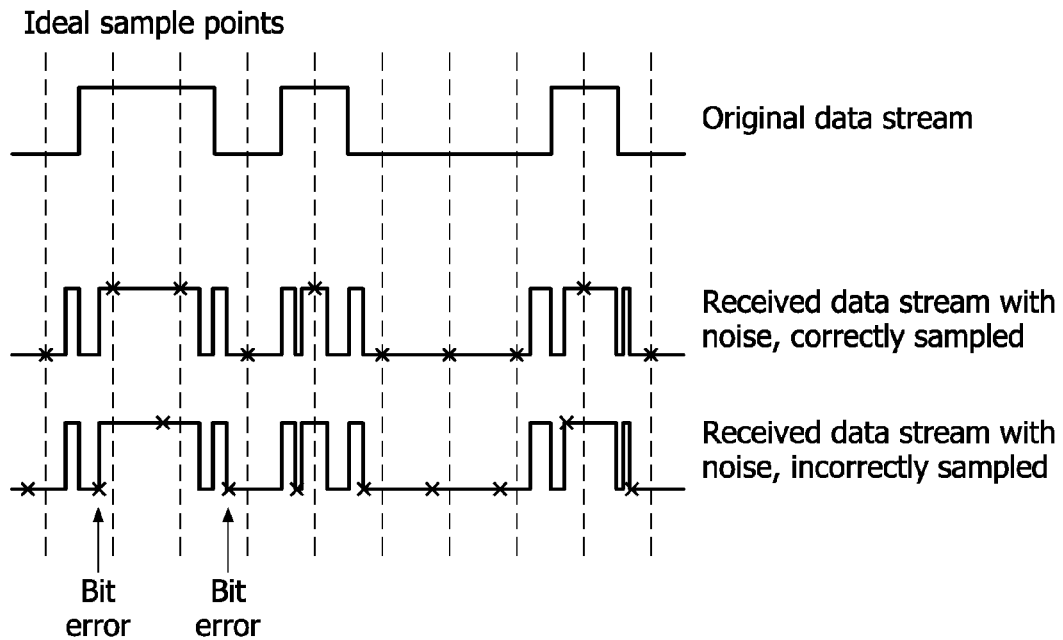
FIG. 1 shows an original data stream and corresponding correctly and incorrectly sampled data streams.
Figure 2:
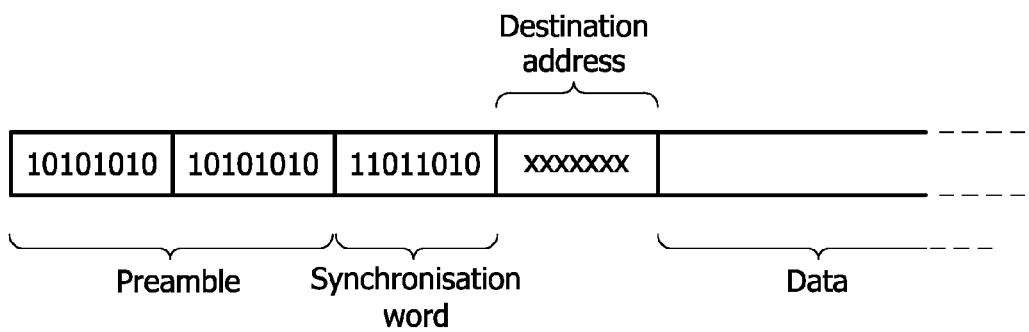
FIG. 2 shows an example of a conventional data packet header structure.
Figure 3A:
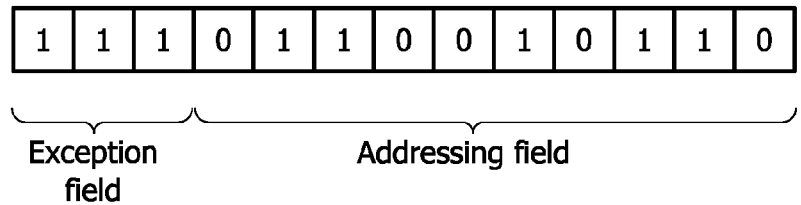
FIG. 3A shows an example of a data packet header structure according to one embodiment.
Figure 4:
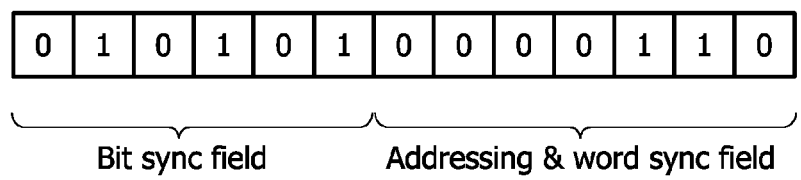
FIG. 4 shows an example of a conventional data packet header structure having the same length as the header in FIGS. 3A and 3B.

FIG. 3A shows a first example of a header structure in accordance with one embodiment. The header structure of FIG. 3A is 13 bits long in this example and it consists of the following bit sequence 1110110010110. It is to be noted that the length of the header is by no means limited to this specific value, but the length can take any reasonable values. As shown in FIG. 3A, the header consists of two bit fields. For the purpose of the following description the first bits field is called exception field and the second bit field is called addressing field. The length of the exception field is 3 bits. It is located at the beginning of the header structure and consists of bits with same values, e.g. logical '1's.

The addressing field immediately follows the exception field in the order of transmission and in this example it consists of 10 bits. The first bit of the addressing field takes a value different from, i.e. opposite to the identical values of the bits in the exception field. Thus, in this example the first bit of the addressing field is 0. Furthermore, the run-length restriction in the addressing field in this example is 3 bits. This means that in the addressing field there cannot be more than two consecutive bits taking the same value. For instance, '01101' is valid, while '01110' is not, because of the three consecutive '1's in the middle of the word. Generally speaking, a run-length restriction of n bits, where n is a positive integer greater than 2, means that there cannot be more than n−1 consecutive bits with the same value.

However, the run-length restriction does not apply to the exception field. The bit sequence of the addressing field is therefore only limited by two rules: run-length restriction, and the bits of the exception field cannot take the same value as the first bit of the addressing field.

Figure 3B:
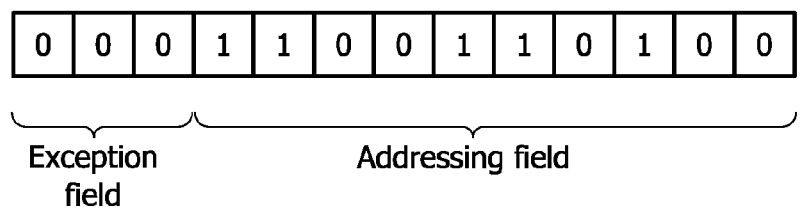
FIG. 3B shows another example of a data packet header structure according to another embodiment.

FIG. 3B shows another example of a header structure in accordance with an embodiment of the present invention. Also in this case the header structure is 13 bits long, but here the exception field consists of 3 '0's as opposed to 3 '1's as in the first example. The whole sequence is in this example 0001100110100. Now to fulfill the rule that the bits of the exception field cannot take the same value as the first bit of the addressing field, the first bit of the addressing field is 1. As in the example of FIG. 3A, the run-length restriction is set to 3 and fulfillment of this rule can be seen by noticing that in the addressing field the maximum number of consecutive bits taking the same value is limited to 2.

In the above examples the length of the exception field is equal to the run-length restriction. However, the length of the exception field can also be longer than this run-length restriction. For instance in the examples presented above, the length of the exception field could be 4 bits. Assuming that the overall header length is kept the same, extending the length of the exception field would improve the exception field wake-up feature, as a longer run of bits in the exception field would reduce the probability of noise giving a false wake-up signal. A longer run of bits would also reduce the potential error in word-alignment, as the exception would still be present if a bit error occurred at the beginning or end of the exception field. On the negative side, increasing the run-length of the addressing field would reduce the number of edges that are potentially available which would reduce the performance of the clock synchronization. It would also reduce the number of valid addresses available, potentially limiting the network size, although this may not matter depending on the application requirements. It is also possible to extend the exception field without reducing the addressing field, but this then increases the length of the header. It is up to the protocol designer to decide what the trade-offs should be.

The performance of the proposed header structure of FIG. 3A is now compared to the performance of a conventional header structure shown in FIG. 4. As in FIG. 3A, the header structure of FIG. 4 is 13 bits long. In this case, the header structure of FIG. 4 consists of a bit synchronization field of 6 bits with alternating values and an addressing and word synchronization field of 7 bits long. As shown in FIG. 4, the bit sequence consists of the following bits: 0101010000110.

For the purposes of comparison, it is assumed that the differences in power consumption of the circuitry required to implement the two packet header structures compared below are negligible.

It is further assumed that bit errors in the headers of both examples are assumed to cause packet errors unless otherwise stated. In a real implementation, the decision could be made that one or more errors are allowed in either system. However, this does not affect the arguments presented below.

The success of bit-clock extraction improves at a diminishing rate with the number of bit-edges against which it can calibrate. In a conventional design, the length of the bit-synchronization field is a trade-off between bit error rate (BER), determined by how well the clock has aligned with the incoming data stream, and the bit-synchronization field length, which presents an unwanted energy overhead. The same can also be said for the proposed header structure. In this case, edges are guaranteed by the addressing field run-length rule. Increasing the length of this will increase the number of bit-edges, albeit at a lower rate than is the case with adjusting the bit-synchronization field in the standard structure.

As far as the clock extraction is concerned, the examples chosen provide equivalent performance. Regarding the proposed header structure, for a 10-bit addressing field, there will be at least 4 edges, plus the extra edge that occurs between this field and the exception field; giving the guaranteed minimum of 5 edges.

Regarding the standard example of FIG. 4, here the number of bit edges is traditionally determined by the length of the bit-synchronization field and is therefore 5. It is feasible to consider a system that uses the addressing and word synchronization field in addition to the bit synchronization field, to improve the performance of the clock extraction circuit. If this was the case, the number of edges would range from 5 to 12. This has less of a benefit than may be expected, however, because the circuit must have selected a good enough phase by the end of the bit synchronization field in order to be able to correctly receive the addressing and word synchronization field. Bit errors in this would result in a packet error. In both examples given above, the oversampling circuitry can be disabled at the end of the 13-bit header. The purpose of the oversampling circuitry will be explainer later when the correlator is explained in more detail.

Synchronization word alignment and therefore valid packet detection will be done in 7 bits for the standard header of FIG. 4. Under the assumption of zero bit errors, and to first order; for a given BER, M, the probability of rejecting a valid packet, i.e. false negative, is 7M. The probability of identifying a packet from noise, i.e. false positive, is M7.

For the proposed system, synchronization word alignment is effectively done over the full 13 bits. The probability of a false negative is 13M with false positives M13.

For these examples, the proposed packet header structure performs substantially better at rejecting noise (M13 compared with M7), and only slightly worse in terms of packet error rate (13M compared with 7M). Whilst the latter comparison may appear to be a disadvantage, only relatively small increases in signal-to-noise ratio are required to compensate for this reduction in performance. Conversely, the improvement in false positives is substantial and can lead to a significant reduction in power being wasted on receiving phantom packets, i.e. packets erroneously extracted from noise. When combined with the feature of correlating once only, as will be explained later, this low false positive rate greatly improves packet error rates (PER). It should be noted that variables such as allowable errors and word lengths could be adjusted to tailor the performance of either structure to the needs of the application with the inevitable trade-offs.

A key advantage of the proposed method is that it allows 178 unique addresses for a header structure of 13 bits long, while the standard method only allows 128 (27) addresses. This means that for equivalent performance, a greater number of devices can be addressed quickly and efficiently. The number of addresses that can be obtained by using the proposed method can be calculated in a number of ways including brute force. When calculating the number of possibilities, the run-length restriction has to be kept in mind. The same synchronization word thus contains many unique addresses, which tell the receiver if it is being addressed or not. All non-addressed receivers can detect that they have received a valid synchronization word and address (3 repeated bits followed by 10 bits with no 3 bit repetition) that is not for them so that they can power down again.

For a single channel system, once one device transmits, it blocks all other devices within its range. The intended recipient must obviously listen to receive its message, but for the rest of the devices within range, they can switch their receivers off for the duration of the message to save power. The run-length and exception rules of the proposed invention allow a device to reliably detect, over all 13 bits, packets destined for other devices in the network. The rules allow this detection to be made without having to use a lookup table of all valid network devices, which is what would be needed to implement similar functionality with the traditional header structure. An onboard timer can be used to awaken the radio after the packet duration has elapsed. In this way, large energy savings can be made without compromising the performance of the network in any way.

Figure 5:
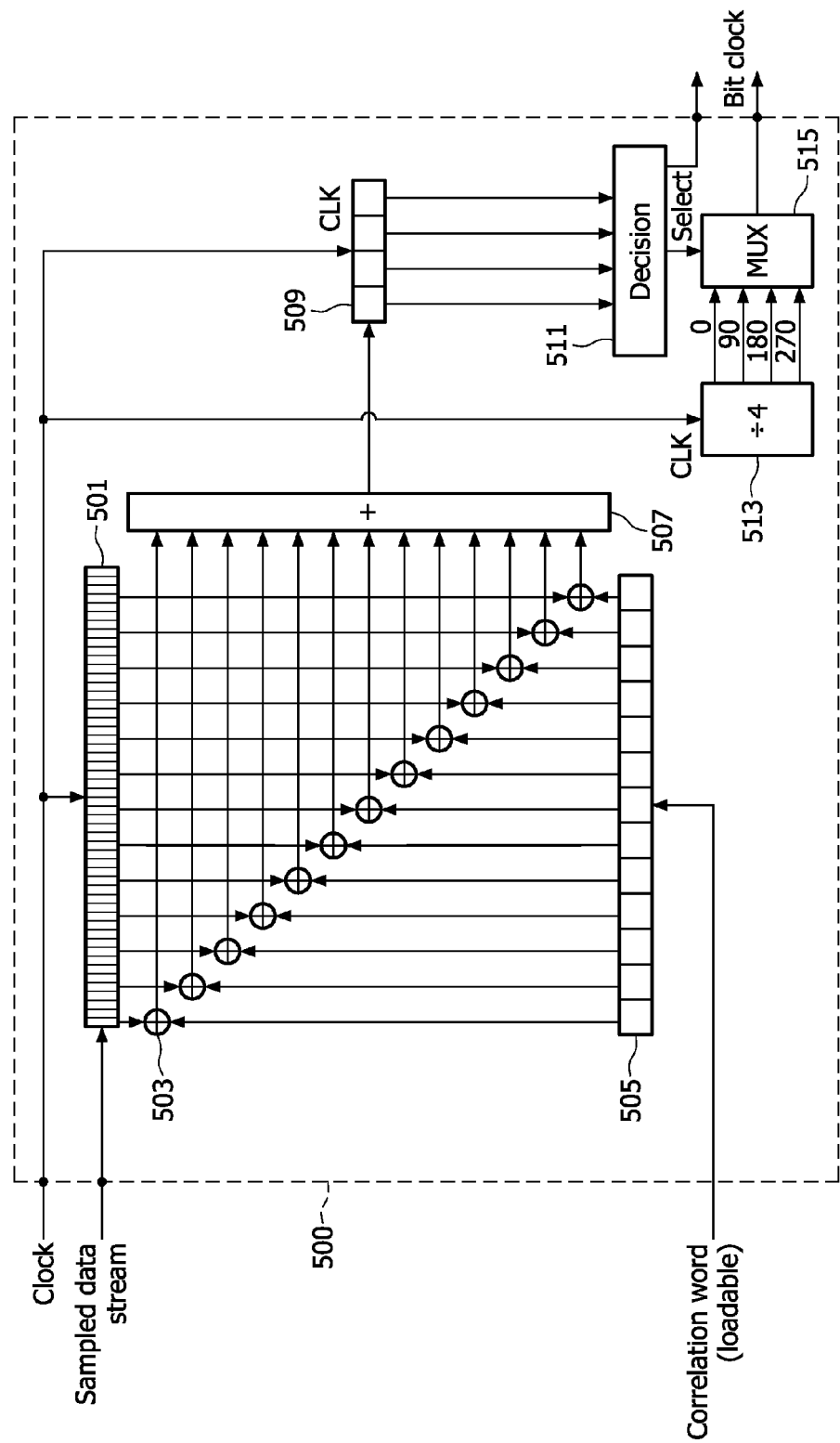
FIG. 5 shows one embodiment of a correlator in accordance with the sixth aspect of the invention for detecting a packet header structure.

FIG. 5 shows the correlator 500 capable of detecting a packet header. It is to be noted that the correlator 500 is equally capable of detecting packet structures as proposed in the present invention but conventional packet structures as well. The structure and operation of the correlator 500 will now be explained in more detail with reference to FIG. 5. In front of the modulator there could be a demodulator for demodulating received data stream and an exception field detector for detecting the exception field. The exception field detector can, for instance, be realized using a simple state machine monitoring the received data stream from the demodulator.

In this example, data bits are clocked or oversampled into a shift register 501 at 4 times the incoming data rate. Other oversampling rates could equally be used. Thus for each data bit, there are 4 data samples each having a distinct phase. The operation of the shift register 501 is controlled by a clock signal. Every fourth position in this shift register 501 is compared by comparison blocks 503 with a bit in a correlation register 505, which contains the correlation word, i.e. contents of the exception and addressing fields. Thus the correlation register contains in this example 13 bits, which corresponds to the length of the packet header structure of FIGS. 3A and 3B. However, it is also possible to use in the correlation only a subsection of the header, for instance the addressing field only.

The comparison results are then fed into a summation block 507 where the errors of each correlation cycle are summed up to form correlation results. A total match between each measured chip and its corresponding bit in the correlation register 505 results in an error count of zero being clocked into a four-stage result register 509. The content of this register is fed directly to a decision block 511 that is used to analyze the four most recent results, i.e. results corresponding to one bit period's worth of time. It is the duty of the decision block 511 to choose a suitable clock phase depending on these results.

In FIG. 5 there is also shown a divide-by-4 block 513 which divides its clock input by four, outputting its result as four signals at pi/2 rads apart. The clock signal is divided by four because the correlator 500 operates at four times the bit rate to provide the four times oversampling within the correlator 500. The outputs from the divide-by-4 block 513 are then fed into a multiplexer 515, which is controlled by the decision block 511. The decision block 511 will select one of these four inputs to sample the packet.

Once the correct phase has been selected, that clock is then used for clocking the rest of the packet into a receive buffer (not shown in the figure). In parallel to this, a successful correlation can be indicated by generating a reset on a divide-by-8 counter (not shown in the figure), which is used as a byte clock providing word alignment. The divide-by-8 block enables clocking of bytes once a packet has been correlated as being received. Thus the correlator 500 is used for indicating a successful match between the received packet header and the correlation word stored in the correlation register 505.

It needs to be noted that the four-stage result register 509 may or may not be necessary based on the implementation of the decision block 511. For instance a state machine implementation won't need the four-stage result register 509 because the memory it affords is effectively embedded in the states of the state machine.

Figure 6:
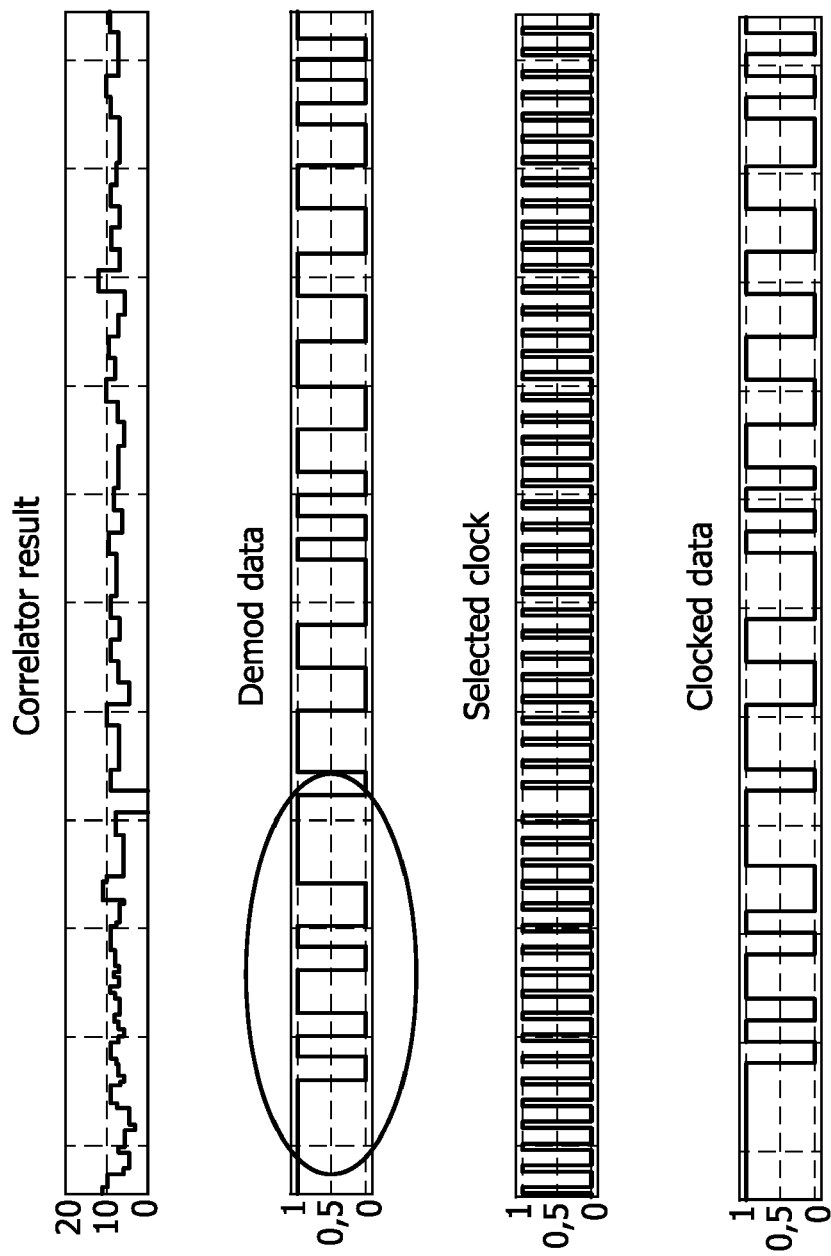
FIG. 6 shows simulation results of the correlator of FIG. 5.

FIG. 6 shows simulation results of the correlator design shown in FIG. 5 with no noise applied to the received data. The top trace (Correlator Result) shows the output of the summation block 507 used to sum all of the bit comparisons together. The vertical axis corresponds to measured errors. It can be seen that once the header has been received in its entirety, the errors reported from the summation block 507 fall to zero for the duration of the bit in which the received header is aligned with the header in the correlation register 505. At this point, the decision block 511 detects this, and makes a choice as to which phase to select for clocking the rest of the packet's data.

"Demod Data" is the output of the demodulator. This demodulated data is effectively "infinitely" sampled i.e. transitions between bits will not occur at known times. This signal must therefore be sampled at the correct phase so that it can be shifted into memory for use by the application. By eye, it is relatively easy to distinguish each bit and read the pattern in this example. However, to do this in hardware is not so trivial. The circled area shows the correlation header received. The process of deciding where the best sampling point is, i.e. the clock extraction, is one of the main purposes of the correlator 500.

The "Selected Clock" trace should therefore be compared against the "demod data" trace, and the reader should be able to see that the positive edges of the "selected clock" trace are approximately at the centre of each of the bits in the "demod data" trace. The change in phase visible in the "selected clock" trace illustrates that the decision block has acted on results obtained from the header correlation (circled), and selected a new phase to ensure the correct sampling point. The "Selected Clock" trace above is the output of the multiplexer 515, and the phase change in this trace is a result of the decision block 511 selecting a different input on the multiplexer 515. It can be seen that the frequency of the clock remains the same, but the phase has shifted. The frequency of the clock is equal to the bit rate of the data.

The "Clocked Data" trace is therefore the "Demod Data" trace sampled at the positive edges by "Selected Clock". If the correlator 500 is successful, this trace should be identical to the original transmitted data (not shown), but implied by the "Demod Data" trace.

Figure 7:
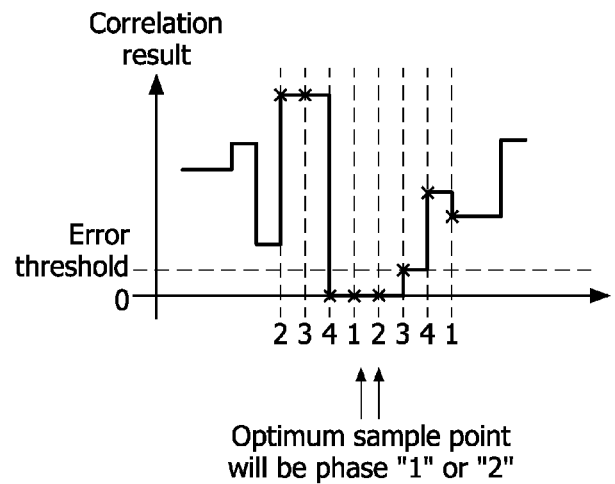
FIG. 7 shows a part of a correlation result illustrating the selection of the optimum sample point.

FIG. 7 illustrates a first algorithm for choosing the correct clock phase. The decision block 511 selects the sample point or phase that falls in the middle of all those sample points of which corresponding sample values, i.e. correlation results, are below a given error threshold as this represents the centre point of a successful correlation. In the example of FIG. 7, clock phases '1' and '2' are both in the middle so further refinement of the decision may be necessary. Looking at the neighboring values of each option provides more information. The chosen sample point should be the one that has the lowest sum of errors in neighboring sample points, so in this case, sample point '2' has one zero-error neighbor, and one non-zero-error neighbor, while sample point '1' has two zero-error neighbors; hence sample point 1 is optimum. If even this doesn't produce a unique result, an arbitrary decision can be made. An error threshold can be used to "zero" all errors below the threshold for the purpose of tuning the algorithm in real systems.

Figure 8:
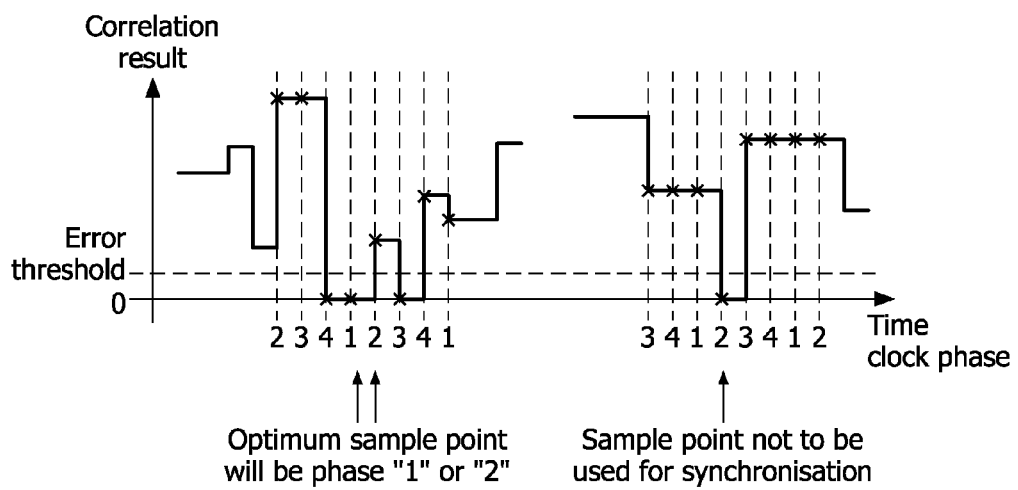
FIG. 8 shows parts of correlator results, where the results include anomalies.

FIG. 8 illustrates a second algorithm for choosing the correct clock phase. In this case the decision algorithm rejects anomalous results. In both graphs shown in FIG. 8, phase '2' can be considered as being an anomalous result. Thus, in FIG. 8 in the first graph from the left the optimum phase is '1' or '2'. In this case synchronization could be done in phase '2', even if this result can be considered as anomalous, because the correlation results of neighboring samples phases, i.e. sample phases '1' and '3' are below the threshold. On the other hand in the second graph no synchronization should be done in phase '2' even if the sample is below the threshold, because this sample can be considered as being an anomalous result, and the correlation results of the neighboring sample phases are above the threshold.

Figure 9A:
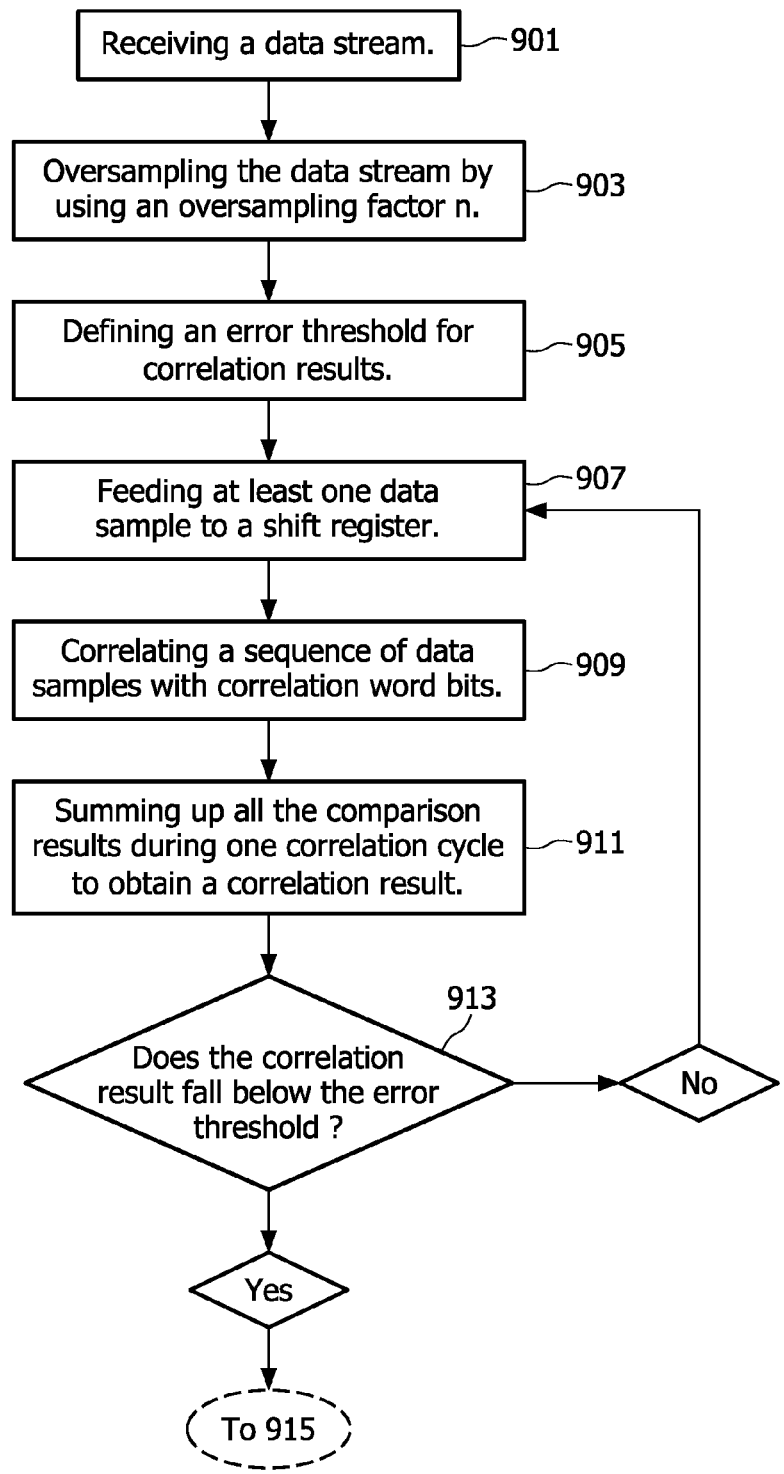
FIGS. 9A and 9B are flow charts illustrating a method for detecting a data stream.
Figure 9B:
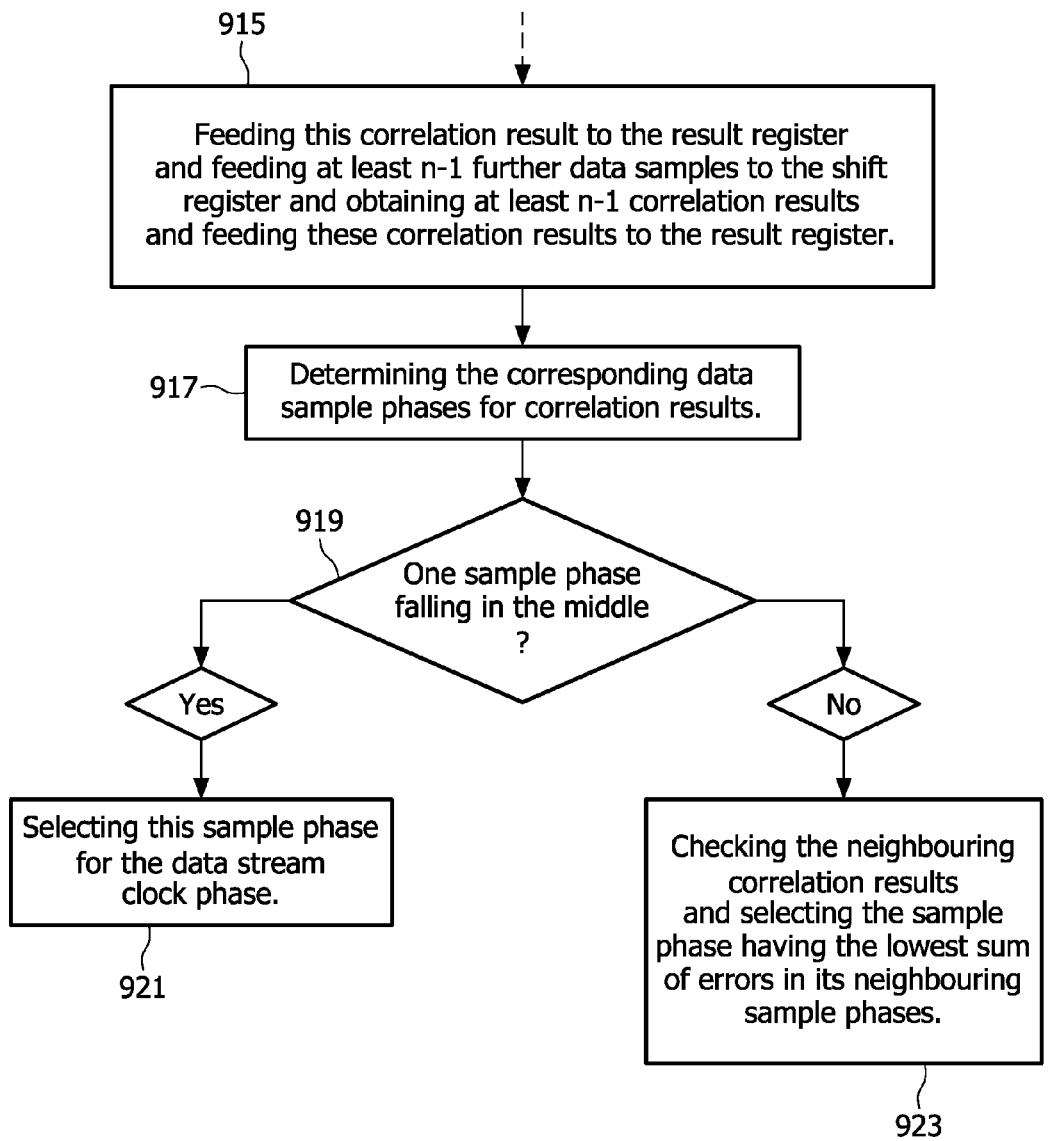

The operation of the correlator 500 is next described with reference to a flow chart of FIG. 9. In step 901, the correlator 500 receives a data stream that comprises the packet header in accordance with the present invention. Next the received data stream is oversampled in step 903 by using an oversampling factor n. This means that for each bit, there are taken n samples, n being a positive integer. It needs to be noted that these two steps are not necessarily performed by the correlator 500, but there can be a separate circuit performing these two steps. Then in step 905, an error threshold for the correlation results is defined. It needs to be noted that this step could equally be performed, for instance, before step 901.

Next in step 907 at least one of the oversampled data samples is fed to the shift register 501. In case the shift register 501 is full, then the data sample or several data samples of the shift register 501 is/are removed to free some space for the incoming data samples. Then every nth sample of a sequence of data samples, in this case the whole length of the shift register, is compared with the correlation word located in the correlation register 505 to obtain comparison results. The comparisons are done during one correlation cycle. During the correlation cycle no new data samples are fed to the shift register 501. After several comparison results are obtained, in this example after 13 comparison results, as there are 13 bits in the correlation register 505, these comparison results are summed up in step 911 in the summation block 507 to obtain a correlation result. In step 913, it is determined whether the correlation result falls below the error threshold. If this is not the case, then the procedure continues in step 907.

On the other hand, if the correlation result falls below the error threshold, then in step 915 this correlation result is fed to the four-stage result register 509. Further data samples are fed to the shift register 501 and further correlations are performed so that at least n−1 subsequent correlation results are fed to the four-stage result register 509. In step 917, the corresponding data sample phases are determined for these correlation results.

Then in step 919 it is determined whether there is only one sample falling in the middle of the samples between the first correlation result falling below the error threshold and the (n−1)th sample after the first sample falling below the threshold. If there is only one sample in the middle, then this sample phase can be selected in step 921 for the data stream clock phase.

On the other hand if there are two samples in the middle as in the examples above, the procedure continues in step 923. As already explained above, the neighboring samples are then checked and the correct sample phase is determined to be the sample phase that has the lowest sum of errors in the neighboring sample phases.

As already explained above, the above method can further be modified by taking the anomalies into account.

In the correlator 500 there can be a state machine which is started by a sample appearing below the error threshold. The phase of this sample is logged. The values of subsequent samples then define the path through the state machine, and after four samples, the state machine will output its decision of whether this is a valid correlation word or not (i.e. the pattern on the right in FIG. 8 would not be a valid word), and if it is, which phase should be used for the rest of the clocking (based on the recorded phase of the first sample). The state machine is designed to run for four clock samples after a trigger, so a decision will be made at the end of those four samples. There can be a further condition, that once the first correlation result falls below the error threshold, then a third (using the oversampling factor of 4) subsequent correlation has to also fall below the error threshold so that the state machine can make a positive determination about a correct sample phase. If this is not the case, the correlator 500 will keep running and search for other correlation results falling below the error threshold.

An extension to the algorithms presented above is to enforce a "correlate once" policy, which means that once the correlator 500 is activated, it will only match once. This prevents it from correlating on data contained within a packet and therefore disturbing the time alignment. For this to be successful, however, the probability of correlating with noise before a valid packet is received must be kept very small so that the packet is not then lost. This is ensured by the substantially reduced false positive error rate of M13 as described above. If false positives need to be reduced further, signal strength detection can be combined with correlation to ensure a transmitter is present. Further optimization can be achieved by adjusting the packet field sizes and run-length rules so that the statistics of the header are altered accordingly.

While the invention has been illustrated and described in detail in the drawings and foregoing description, such illustration and description are to be considered illustrative or exemplary and not restrictive; the invention is not restricted to the disclosed embodiments.

Other variations to the disclosed embodiments can be understood and effected by those skilled in the art in practicing the claimed invention, from a study of the drawings, the disclosure and the appended claims. For instance even if the embodiments presented above describe a 13 bit header comprising a 3 bit exception field, and 10 bit addressing field with a 3 bit run-length restriction, other combinations of field lengths are not excluded, as performance is traded against energy consumption as these values are adjusted. The header structure of the present invention is for instance applicable to MAC communications and is, therefore, of use in all radio systems looking to maximize efficiency such as ultra-low power communications systems where energy efficiency is highly critical.

Alternative implementation for the correlator for detecting a valid header would be to use a matched filter. The clock phase would be found from the resulting maxima (or minima) of the filter's output, and detection could be assumed based on the value of this output. In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method of generating a data packet header at a transceiver of a communication system, comprising:
   generating at said transceiver a first bit field having a first sequence of bits with identical values; and
   placing at said transceiver a second bit field having a second sequence of bits immediately after the first sequence of bits in the order of transmission, the second sequence being subject to a run-length restriction,
   wherein the bits of the first sequence are defined as having identical values to a value of the first bit of the second sequence of bits,
   wherein the number of bits of the first sequence is defined as being equal or exceeding the maximum run-length restriction, and
   wherein all bits in the first and second bit fields are adapted to serve as device address bits.

2. The method according to claim 1, wherein all bits in the first and second bit fields are adapted to serve for clock extraction and word alignment.

3. The method according to claim 1, wherein the first bit field is adapted to activate a correlator of a system capable of receiving the packet header once a valid first bit field has been received, wherein the first bit field is adapted to serve as a wakeup field for the system.

4. A transceiver of a communication system for generating a data packet header, said transceiver comprising:
   means for generating a first bit field having a first sequence of bits with identical values;
   means for placing a second bit field having a second sequence of bits immediately after the first sequence of bits in the order of transmission, the second sequence being subject to a run-length restriction, said transceiver being arranged such that the bits of the first sequence are defined as having identical values opposite to a value of the first bit of the second sequence of bits, wherein the number of bits of the first sequence is defined as being equal or exceeding the maximum run-length restriction, and all bits in the first and second bit fields adapted to serve as device address bits.

5. A computer readable storage medium having stored thereon a data packet header comprising a first bit field having a first sequence of bits with identical values and a second bit field having a second sequence of bits, the second sequence of bits being subject to a run-length restriction, and being located immediately after the first sequence of bits in the order of transmission, the number of bits in the first sequence being equal to or exceeding the run-length restriction, the bits of the first sequence having identical values opposite to a value of to the first bit of the second sequence of bits, and all bits in the first and second bit fields adapted to serve as device address bits.

* * * * *